US012141479B2

(12) United States Patent
Wang et al.

(10) Patent No.: US 12,141,479 B2
(45) Date of Patent: Nov. 12, 2024

(54) DATA CACHE SCHEME FOR HIGH PERFORMANCE FLASH MEMORIES

(71) Applicant: T-Head (Shanghai) Semiconductor Co., Ltd., Shanghai Free Trade Area (CN)

(72) Inventors: Jifeng Wang, Chengdu (CN); Yuming Xu, Chengdu (CN); Wentao Wu, Shanghai (CN); Fei Xue, Sunnyvale, CA (US); Xiang Gao, Shanghai (CN); Jiajing Jin, Hangzhou (CN)

(73) Assignee: T-Head (Shanghai) Semiconductor Co., Ltd., Shanghai Free Trade Area (CN)

( * ) Notice: Subject to any disclaimer, the term of this patent is extended or adjusted under 35 U.S.C. 154(b) by 0 days.

(21) Appl. No.: 18/174,269

(22) Filed: Feb. 24, 2023

(65) Prior Publication Data

US 2024/0176539 A1   May 30, 2024

(30) Foreign Application Priority Data

Nov. 30, 2022   (CN) .......................... 202211527666.3

(51) Int. Cl.
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0631* (2013.01);
(Continued)

(58) Field of Classification Search
None
See application file for complete search history.

(56) References Cited

U.S. PATENT DOCUMENTS 7,596,662 B2   9/2009   Makineni et al.
7,707,354 B2   4/2010   Lee et al.
(Continued)

FOREIGN PATENT DOCUMENTS

CN   112947869 A   *   6/2021   ............. G06F 3/061
CN   115543221 A   *   12/2022

OTHER PUBLICATIONS

Translation of CN-112947869-A.*
Translation of CN-115543221-A.*

*Primary Examiner* — Nathan Sadler

(57) ABSTRACT

This application describes systems and methods for facilitating memory access in flash drives. An example method performed by a memory controller may include receiving, from a host, a write command comprising data to be written into a flash memory; splitting the data into a first portion and a second portion; storing the first portion into a static random-access memory (SRAM) in the memory controller; storing the second portion into a dynamic random-access memory (DRAM) communicatively coupled with the memory controller; initiating a configuration operation corresponding to the write command; fetching the first portion from the SRAM and the second portion from the DRAM in response to the flash translation layer indicating a ready status to store the data into the flash memory; combining the fetched first portion and the fetched second portion; and storing the combined first portion and the second portion into the flash memory.

18 Claims, 7 Drawing Sheets

(52) U.S. Cl.
CPC .......... *G06F 3/0656* (2013.01); *G06F 3/0688* (2013.01); *G06F 12/0246* (2013.01); *G06F 2212/225* (2013.01); *G06F 2212/283* (2013.01); *G06F 2212/7203* (2013.01)

(56) References Cited

U.S. PATENT DOCUMENTS

| | | | |
|---|---|---|---|
| 7,761,653 B2 | 7/2010 | Lee et al. | |
| 7,808,824 B2 | 10/2010 | Doyle | |
| 8,028,119 B2 | 9/2011 | Miura | |
| 8,069,297 B2 | 11/2011 | Nishihara | |
| 8,363,468 B2 | 1/2013 | Shimizu et al. | |
| 8,386,713 B2 | 2/2013 | Kaneko et al. | |
| 8,452,912 B2 | 5/2013 | Lee et al. | |
| 8,656,092 B2 | 2/2014 | Ha | |
| 8,954,654 B2 | 2/2015 | Yu et al. | |
| 9,075,740 B2 | 7/2015 | Nagadomi et al. | |
| 9,128,847 B2 | 9/2015 | Ito et al. | |
| 9,195,592 B1 | 11/2015 | Weingarten et al. | |
| 9,235,506 B2 | 1/2016 | Maheshwari et al. | |
| 9,548,108 B2 | 1/2017 | Yu et al. | |
| 11,080,185 B2 | 8/2021 | Ware | |
| 11,218,164 B2 | 1/2022 | Lin et al. | |
| 2005/0273560 A1 | 12/2005 | Hulbert et al. | |
| 2007/0288688 A1* | 12/2007 | Kang | G06F 12/0607 |
| | | | 711/E12.079 |
| 2010/0023681 A1 | 1/2010 | Sinclair et al. | |
| 2012/0072651 A1 | 3/2012 | Randell et al. | |
| 2014/0351498 A1 | 11/2014 | Hsueh et al. | |
| 2016/0224466 A1* | 8/2016 | You | G06F 12/0873 |
| 2017/0286298 A1 | 10/2017 | Geetha et al. | |
| 2019/0324859 A1* | 10/2019 | Armstrong | G11C 29/52 |
| 2020/0394131 A1 | 12/2020 | Lin et al. | |
| 2021/0303199 A1* | 9/2021 | Horspool | G06F 3/0614 |
| 2021/0318963 A1 | 10/2021 | Kim | |
| 2021/0365372 A1 | 11/2021 | Kim | |
| 2021/0373802 A1* | 12/2021 | Helmick | G06F 3/0629 |
| 2022/0229725 A1* | 7/2022 | Kanter | H03M 13/09 |
| 2023/0047029 A1* | 2/2023 | Hanham | G06F 3/0631 |

* cited by examiner

DATA CACHE SCHEME FOR HIGH PERFORMANCE FLASH MEMORIES

CROSS REFERENCE TO RELATED APPLICATION

This application claims priority to and benefits of Chinese patent Application No. 202211527666.3, filed with the China National Intellectual Property Administration (CNIPA) on Nov. 30, 2022. The entire contents of the above-identified application are incorporated herein by reference.

TECHNICAL FIELD

The disclosure relates generally to data accessing on flash memories.

BACKGROUND

Memory access on flash memories in a flash drive memory system can include reading operations and writing operations. Writing operations of a large amount of data on the flash memories can become bottlenecks in executing applications, and memory controllers of the flash memories sometimes use external Dynamic Random-Access Memory (DRAMs) as cache memory to speed up the writing operations. As demands for overall I/O throughput continue to grow for flash memories, the DRAMs also need to grow in capacity, causing significant strain on the I/O throughput of the memory controller and the energy efficiency of the flash drive memory system.

SUMMARY

Various embodiments of the present specification may include hardware circuits, systems, methods for data accessing on flash memories.

According to one aspect, a system comprises a host; a memory controller communicatively coupled with the host; a dynamic random-access memory (DRAM) communicatively coupled with the memory controller; and a flash memory communicatively coupled to the memory controller, wherein the memory controller comprises a static random-access memory (SRAM) and is configured to: receive, from the host, a write command comprising data to be written to the flash memory, split the data into a first section and a second section, store the first portion into the SRAM, store the second portion into the DRAM, initiate a configuration operation corresponding to the write command using a flash translation layer in the memory controller, fetch the first portion from the SRAM and the second portion from the DRAM in response to the flash translation layer indicating a ready status to store the data into the flash memory, combining the fetched first portion and the fetched second portion, and storing the combined first portion and the second portion into the flash memory.

In some embodiments, the memory controller is implemented on an application-specific integrated circuit (ASIC).

In some embodiments, the flash memory includes solid state drives (SSDs).

In some embodiments, to split the data into the first section and the second section, the memory controller is further configured to divide the data into a plurality of sections, wherein: the plurality of sections include a first type of sections and a second type of sections, each of the first type of sections is of a first length, each of the second type of sections is of a second length, each of the first type of sections adjoins at least one of the second type of sections in the data, and the first portion comprises the first type of sections and the second portion comprises the second type of sections. In some embodiments, the first length and the second length are adjustable using software on the host.

In some embodiments, to split the data into the first section and the second section, the memory controller is further configured to divide the data into a plurality of sections, wherein: the plurality of sections include a first type of sections and a second type of sections, each of the first type of sections is of a first length, each of the second type of sections is of a second length, two adjoining sections of the first type and the second type add to a size of a sector in the flash drive, and the first portion comprises the first type of sections and the second portion comprises the second type of sections. In some embodiments, the first length and the second length are adjustable using software on the host.

In some embodiments, the DRAM is one or more double data rate (DDR) synchronous dynamic random access memory (SDRAM).

In some embodiments, the memory controller is further configured to: allocate, by an SRAM controller in the memory controller, a first memory space in the SRAM to store the first portion; allocate, by a DRAM controller in the memory controller, a second memory space in the DRAM to store the second portion; and freeing, by the memory controller, the first memory space and the second memory space in response to storing the combined first portion and the second portion into the flash memory.

In some embodiments, the memory controller is an open-channel controller for the flash memory.

According to another aspect, a method comprises receiving, by a memory controller from a host, a write command comprising data to be written into a flash memory; splitting, by the memory controller, the data into a first portion and a second portion; storing, by the memory controller, the first portion into a static random-access memory (SRAM) in the memory controller; storing, by the memory controller, the second portion into a dynamic random-access memory (DRAM) communicatively coupled with the memory controller; initiating, by a flash translation layer in the memory controller, a configuration operation corresponding to the write command; fetching, by the memory controller, the first portion from the SRAM and the second portion from the DRAM in response to the flash translation layer indicating a ready status to store the data into the flash memory; combining, by the memory controller, the fetched first portion and the fetched second portion; and storing, by the flash translation layer, the combined first portion and the second portion into the flash memory.

According to another aspect, non-transitory computer-readable storage media store instructions that, when executed by one or more processors, cause the one or more processors to perform operations comprising: receiving, by a memory controller from a host, a write command comprising data to be written into a flash memory; splitting, by the memory controller, the data into a first portion and a second portion; storing, by the memory controller, the first portion into a static random-access memory (SRAM) in the memory controller; storing, by the memory controller, the second portion into a dynamic random-access memory (DRAM) communicatively coupled with the memory controller; initiating, by a flash translation layer in the memory controller, a configuration operation corresponding to the write command; fetching, by the memory controller, the first portion from the SRAM and the second portion from the DRAM in response to the flash translation layer indicating a ready status to store the data into the flash memory; combining, by the memory controller, the fetched first portion and the fetched second portion; and storing, by the flash translation layer, the combined first portion and the second portion into the flash memory.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

DETAILED DESCRIPTION

Figure 1:
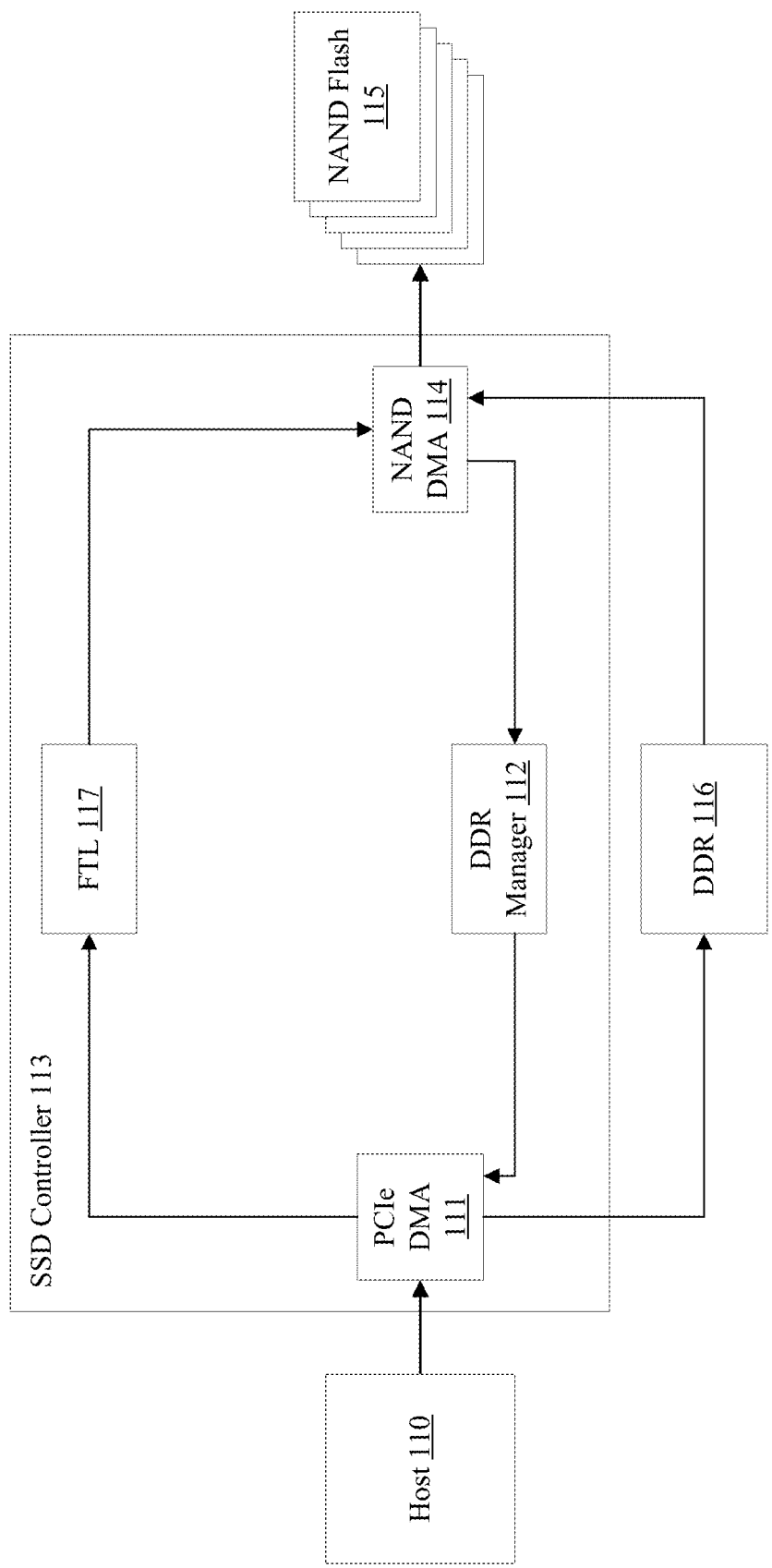
FIG. 1 is a schematic of an example architecture of a flash drive memory system, according to some embodiments of this specification.

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

NAND flash is a type of non-volatile flash memory using floating-gate transistors. In NAND flash, data can be stored in bits, where typically one cell can store one bit. These cells can be grouped into bit lines of the NAND flash. A plurality of bit lines can then be grouped into pages, and a plurality of pages can be grouped to form a block. A NAND flash can comprise a plurality of blocks, and an exact number of blocks in a NAND flash can depend on a specification of the NAND flash. For write operations, NAND flash can write using a page as a unit. For erase operations, NAND flash erases one block at a time. The number of erase operations that can be performed on a block is finite. The maximum number of erases that is allowed on a block can be referred to as program erase cycles. It is appreciated that unless otherwise indicated, NAND flash is used as an example of flash memories in this specification, and the term NAND flash can refer to any other similar memory entities.

A logical block address (LBA) is a common scheme for specifying locations of data at an application level or a host level. LBAs are visible to applications or hosts, and to access data pointed to by the LBAs in flash drives, the LBAs need to be translated into physical addresses in the flash drives. When a host stores data at a specific LBA, such as LBA 0, and later rewrites into the same LBA 0, the new data may be stored in a different physical address in the flash drives, but a mapping table of the NAND flash can be modified, so that the LBA 0 now points to the new physical address storing the new data. The new data is still written into the NAND memory in a serial manner.

A solid-state drive (SSD) is a memory drive that can use NAND flash to store data persistently. An SSD controller can be an embedded processor on the SSD or an open-channel controller, and the SSD controller can be configured to execute firmware-level software for the SSD and accelerate data access and processing on the SSD.

A random-access memory (RAM) is a volatile form of computer memory that allows data to be read or written in almost a same amount of time irrespective of a physical location of the data inside the memory.

A Synchronous Dynamic Random-Access Memory (SDRAM) is a type of dynamic random access memory (DRAM) that provides faster data accessing.

A static random-access memory (SRAM) is a type of RAM that is generally faster and more expensive than dynamic RAMs, which need to be periodically refreshed.

A flash translation layer (FTL) is an intermediate layer configured to manage SSD operations. The FTL can comprise hardware, software, or both, and the FTL can be configured to perform logical-to-physical addresses translation, garbage collection, wear-leveling, error correction code (ECC), bad block management, etc.

A flash physical address (FPA) refers to a physical address on the NAND flash. For example, an FPA can include a block number, a channel number, a page number, etc. for a specific physical address on the NAND flash.

A double data rate (DDR) SDRAM is a double data rate SDRAM that provides higher transfer data rates. Unless indicated otherwise, DDR can refer to DDR1 SDRAM, DDR2 SDRAM, DDR3 SDRAM, DDR4 SDRAM, DDR5 SDRAM, etc.

A Peripheral Component Interconnect Express (PCIe) is a high-speed computer bus standard. The PCIe is capable of connecting SSDs with processors (e.g., central processing units (CPUs)).

A direct memory access (DMA) is a feature (e.g., a module, a circuitry, etc.) that allows hardware systems to access memory, independently of a host or a CPU on the host. For example, with a DMA implemented, a CPU can initiate a data transfer, and then perform other operations while the transfer is in progress and being handled by the DMA. When the data transfer is done, the DMA can send a completion signal to the CPU. As a result, the CPU may not need to wait on the completion of the data transfer before taking on other operations.

A sector is a storage unit in SSDs. One typical range of a sector on an industry-scale SSD is 4096 bytes (i.e., approximately 4 KB). A sector can be a basic unit for read and write operations on the SSDs. For example, a sector can be a block on the SSD. In some embodiments, a sector can also include metadata for the data covered by the sector's range.

Although SSDs can provide fast read and write bandwidth using NAND flash (or other types of storage media), for industry-sized applications, performing writing operations of a large amount of data onto the NAND flash of the SSDs can be very time consuming. To mitigate, SSDs may have one or more internal DDRs as data cache. When data is transferred from a host to the SSDs, the SSDs can store the data into the internal DDRs first, and return a writing completion signal to the host. Then, when the NAND flash is ready for more writing operations, the SSDs can transfer the data from the DDRs onto the NAND flash. From the host's perspective, the writing operation was finished (e.g., indicated by a DMA of the SSDs) when the data was stored onto the DDRs. As a result, the host may not need to wait on the SSDs to complete the writing operations on the NAND flash, and the efficiency of executing applications may be improved.

FIG. 1 is a schematic of an example architecture of a flash drive memory system, according to some embodiments of this specification. As shown in FIG. 1, a flash drive memory system 100 comprises a host 110, an SSD controller 113, flash memory (e.g., NAND flash) 115, and DDR 116. The schematic in FIG. 1 is for illustrative purposes only, and flash drive memory system 100 shown in FIG. 1 may have fewer, more, and alternative components and connections depending on the implementation.

In some embodiments, host 110 comprises one or more CPUs, which can be connected with SSD controller 113 via a PCIe connection. In some embodiments, NAND flash 115 can comprise a plurality of NAND flash memories. In some embodiments, SSD controller 113 comprises a PCIe DMA 111, an FTL 117, a NAND DMA 114, and a DDR manager 112. PCIe DMA 111 can be configured to utilize DMA to manage data transfers between host 110 and SSD controller 113. FTL 117 can be configured to perform logical-to-physical addresses translations for flash drive memory system 100. NAND DMA 114 can be configured utilize DMA to manage data transfers to and from NAND flash 115. DDR manager 112 can be configured to manage data transfers to and from DDR 116.

In some embodiments, DDR 116 is external to SSD controller 113. For example, DDR 116 can be external to a chip or an application-specific integrated circuit (ASIC) hosting SSD controller 113. Although DDR 116 is shown in FIG. 1, it is appreciated that DDR 116 can be any similar type of RAM, such as SDRAM. In some embodiments, SSD controller 113 can be implemented on a field programmable gate arrays (FPGA). It is appreciated that SSD controller 113 is used as an example, as SSD controller 113 can be any types of memory controllers in charge of handling memory operations on NAND flash 115.

Figure 2:
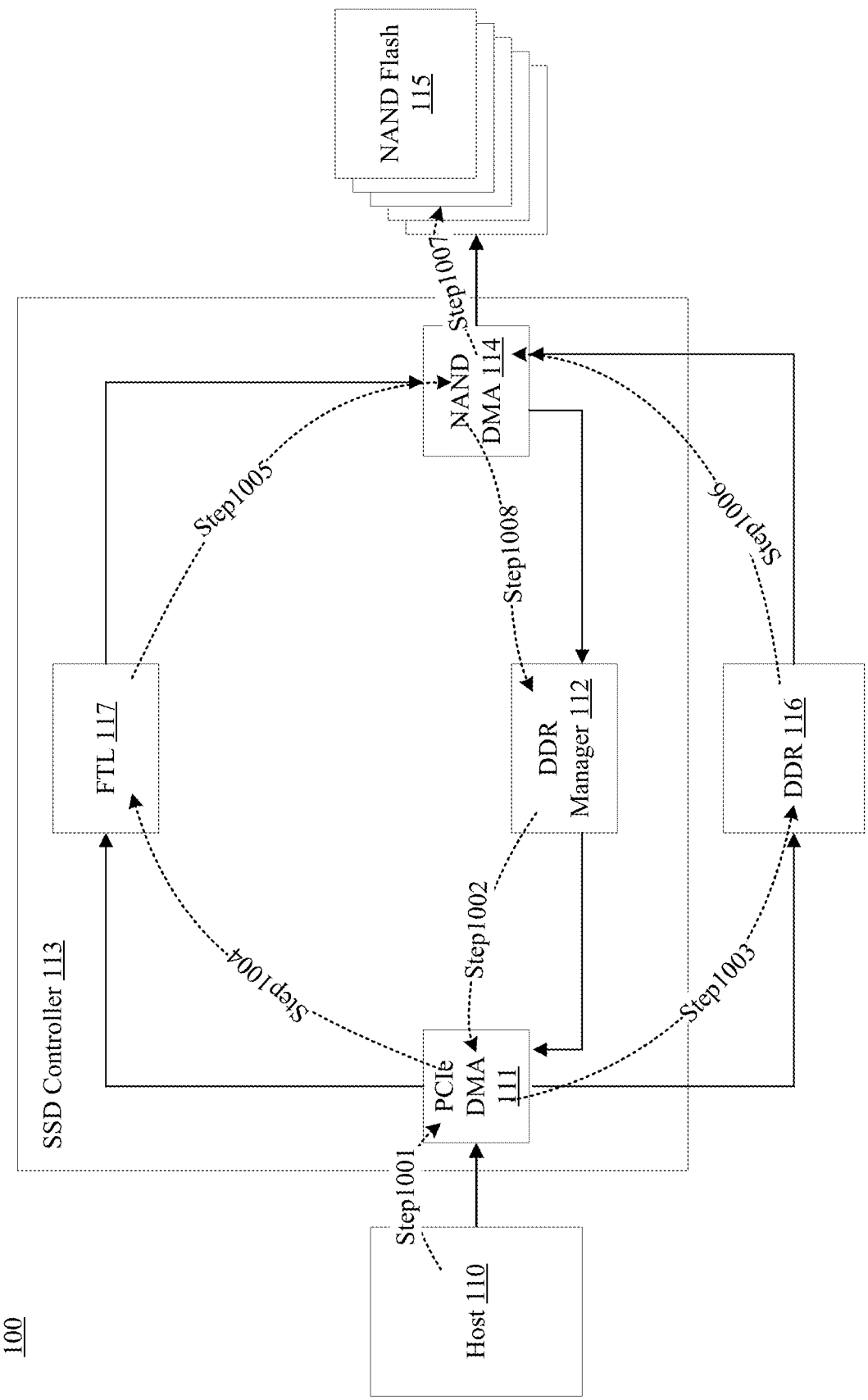
FIG. 2 is a schematic of an example workflow of a flash drive memory system with external memories, according to some embodiments of this specification.

FIG. 2 is a schematic of an example workflow of a flash drive memory system with external memories, according to some embodiments of this specification. It is appreciated that the workflow shown in FIG. 2 can be conducted by flash drive memory system 100 shown in FIG. 1. FIG. 2 is for illustrative purposes only, and the workflow shown in FIG. 2 may have fewer, more, and alternative steps, components and connections depending on the implementation.

As shown in FIG. 2, in step 1001, host 110 (e.g., a CPU inside host 110) initiates a writing operation on an SSD. The writing operation and data to be written are transferred to PCIe DMA 111 from host 110.

In step 1002, PCIe DMA 111 communicates with DDR manager 112 to request a memory space in DDR 116.

In step 1003, PCIe DMA 11 receives a memory address of the memory space in DDR 116 from DDR manager 112, and writes the data into the memory space using the memory address.

In step 1004, in response to completing step 1003, PCIe DMA 111 communicates with FTL 117 to indicate that the data to be written is ready.

In step 1005, FTL 117 performs memory management operations (e.g., logical-to-physical addresses translations), and performs a configuration operation on NAND flash 115. In some embodiments, the configuration operation can include communicating to NAND flash 115 the memory address allocated from step 1003.

In step 1006, in response to completing the memory management operations from step 1005 or receiving a ready signal that the FTL is ready to store the data, NAND DMA 114 reads out the data from DDR 116 using the memory address.

In step 1007, NAND DMA 114 writes the data onto NAND flash 115 to complete the configuration operation.

In step 1008, DDR manager 112 releases the memory address for future use.

As shown in FIG. 2, flash drive memory system 100 uses DDR 116 as a buffer to store data while NAND flash 115 is being configured. As a result, host 110 can be freed to perform other operations instead of waiting on the write operation to finish. As PCIe technologies continue to advance (e.g., PCIe5.0), data transfer rate between host 110 and SSDs (e.g., SSD controller 113) continues to increase. However, to accommodate the higher data transfer rate, more DDRs or higher-capacity DDRs needs to be available as a part of the flash drive memory system, which can ramp up cost significantly and add additional stress energy use and energy efficiency. For example, SSD controller 113 is usually hosted on a chip or an ASIC that is designed to be smaller in size and efficient in energy consumption. One of the hardware constraints is that the overall I/O bandwidth to and from the chip is limited (e.g., number of PCIe slots and bandwidth per slot are fixed). As a result, adding more external DDRs to the flash drive memory system can cause significant strains on the I/O bandwidth. One solution is to place SSD controller 113 on a larger chip with a higher I/O bandwidth. However, such hardware can add more cost and cause an increase in energy use, which is not desired. In addition, adding more DDRs can cause the flash drive memory system to generate significantly more heat when operating, which then requires additional resources and energy usage to accommodate for heat dissipation. Moreover, in modern day databases and cloud environments, SSD controllers can be tasked to assist in executing applications of different varieties, and they can be connected to flash memories having different capacities. Different applications can vary in their memory usage. For example, some applications can write bulks of data within a short period of time, while some other applications have a tendency to write data in a more uniform fashion. SSD controllers handling flash memories of a higher capacity may need a larger DDR as cache, and SSD controllers handling flash memories of lower capacity may be satisfied with a smaller DDR. As a result, it can be advantageous for SSD controllers to be flexible in its set up with cache handling.

Figure 3:
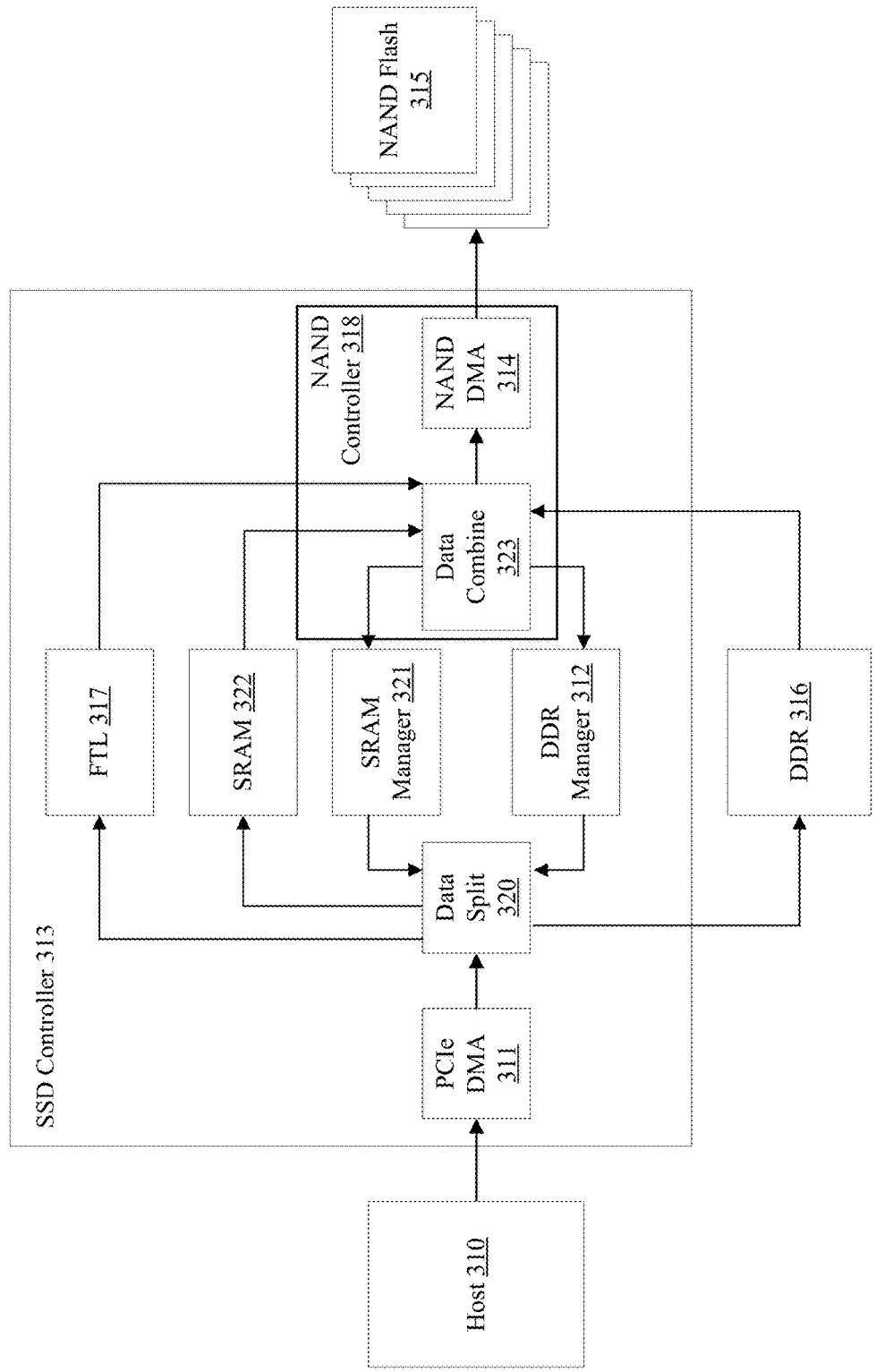
FIG. 3 is a schematic of an example architecture of a flash drive memory system with a combination of memories, according to some embodiments of this specification.

To solve the issues listed above, embodiments of this specification provide systems and methods for improved flash memory data caching using a combination of hardware memories. FIG. 3 is a schematic of an example architecture of a flash drive memory system with a combination of memories, according to some embodiments of this specification. FIG. 3 is for illustrative purposes only, and the architecture shown in FIG. 3 may have fewer, more, and alternative steps, components and connections depending on the implementation.

As shown in FIG. 3, a flash drive memory system 300 comprises a host 310 (e.g., similar to host 110 of FIG. 1), an SSD controller 313, NAND flash 315 (e.g., similar to NAND flash 115 of FIG. 1), and DDR 316 (e.g., similar to DDR 116 of FIG. 1).

In some embodiments, DDR 316 is external to SSD controller 313. For example, DDR 316 can be external to a chip or an application-specific integrated circuit (ASIC) hosting SSD controller 313. Although DDR 316 is shown in FIG. 3, it is appreciated that DDR 316 can be any similar type of RAM, such as SDRAM. In some embodiments, SSD controller 313 can be implemented on an FPGA. In some embodiments, SSD controller 313 can be an open-channel controller. It is appreciated that SSD controller 313 is used as an example, as SSD controller 113 can be any types of memory controllers in charge of handling memory operations on NAND flash 315.

In some embodiments, SSD controller 313 comprises a PCIe DMA 311 (e.g., similar to PCIe DMA 111 of FIG. 1), an FTL 317 (e.g., similar to FTL 117 of FIG. 1), a NAND DMA 314 (e.g., similar to NAND DMA 114 of FIG. 1), and a DDR manager 312 (e.g., similar to DDR manager 112 of FIG. 1). In some embodiments, SSD controller 313 comprises a data split module 320, an SRAM manager 321, an SRAM 322, and a data combine module 323. Data split module 320 can be communicatively coupled with SRAM manager 321 and DDR manager 312, and configured to determine whether to push the incoming data to SRAM manager 321 or DDR manager 312 or both. SRAM manager 321 can be configured to allocate and manage storage spaces in SRAM 322. Data combine module 323 can be configured to communicate with SRAM manager 321 and DDR manager 312 to read and combine data from SRAM 322 and DDR 316. In some embodiments, SSD controller 313 further comprises a NAND controller 318, which can include data combine module 323 and NAND DMA 314.

Figure 4:
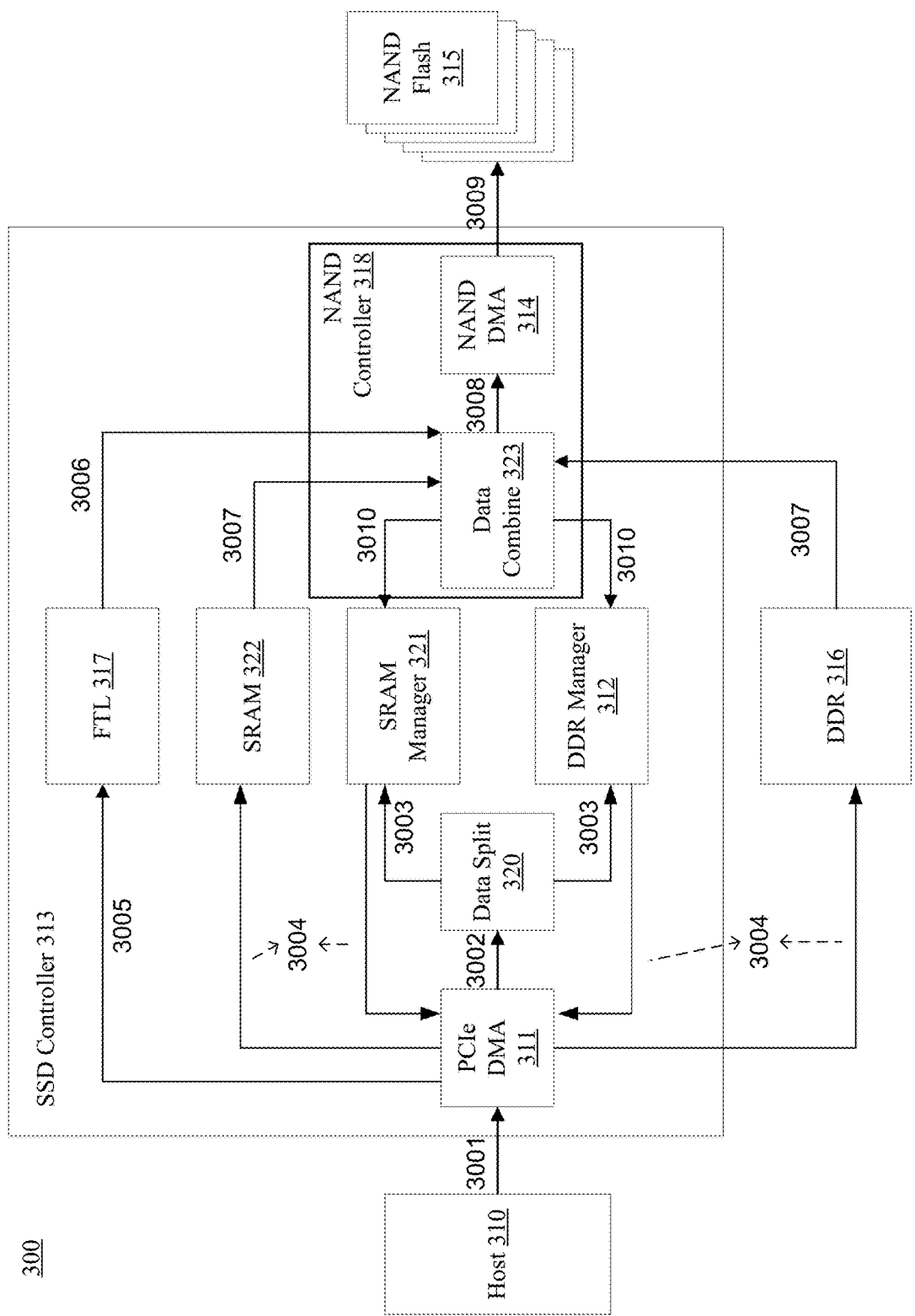
FIG. 4 is a schematic of an example workflow of a flash drive memory system with a combination of memories, according to some embodiments of this specification.

FIG. 4 is a schematic of an example workflow of a flash drive memory system with a combination of memories, according to some embodiments of this specification. It is appreciated that the workflow shown in FIG. 4 can be conducted by flash drive memory system 300 shown in FIG. 3. FIG. 4 is for illustrative purposes only, and the workflow shown in FIG. 4 may have fewer, more, and alternative steps, components and connections depending on the implementation.

As shown in FIG. 4, in step 3001, host 110 (e.g., a CPU inside host 310) initiates a writing operations on an SSD. The writing operation and data to be written are transferred to PCIe DMA 311 from host 310. In some embodiments, the data to be written can be a part of the writing operation.

In step 3002, PCIe DMA 311 communicates with data split module 320 to transfer the writing operation and data to be written to data split module 320.

In step 3003, data split module 320 splits data based on a predetermined splitting configuration, and communicates with SRAM manager 321 and DDR 312 to request a memory space in SRAM 322 and DDR 316. In some embodiments, depending on the predetermined splitting configuration, the data to be written may be stored in SRAM 322 only, in DDR 316 only, or in both SRAM 322 and DDR 316. In some embodiments, one predetermined splitting configuration can include requesting a memory space in SRAM 322 first through SRAM manager 321, and when SRAM 322 runs out of space to store the data in its entirety, additional memory space in DDR 316 is requested through DDR manager 312.

In step 3004, PCIe DMA 311 receives one or more memory addresses of the memory space in DDR 316 from DDR manager 312, in SRAM 322 from SRAM manager 321, or both, and writes the data into the memory space using the memory addresses. The memory space in DDR can be allocated by DDR manager 312, and the memory space in SRAM 322 can be allocated by SRAM manager 321.

In step 3005, in response to completing step 3004, PCIe DMA 311 communicates with FTL 317 to indicate that the data to be written is ready.

In step 3006, FTL 317 performs memory management operations (e.g., logical-to-physical addresses translations), and performs a configuration operation on NAND flash 315. In some embodiments, the configuration operation can include communicating to NAND flash 315 the memory addresses allocated from step 3004.

In step 3007, in response to completing the memory management operations from step 3006 or receiving a ready signal from the FTL that the FTL is ready to store the data, data combine module 323 reads out the data from DDR 316, SRAM 322, or both, using the memory addresses, and combines the data. In some embodiments, combining the data can be performed according to the predetermined splitting configuration. In some embodiments, step 3007 is executed further in response to receiving communication in step 3005 indicating that the data to be written is ready.

In step 3008, data combine module 323 transfers the combined data to NAND DMA 314.

In step 3009, NAND DMA 314 writes the combined data onto NAND flash 315 to complete the configuration operation.

In step 3010, DDR manager 312 releases the memory addresses for future use.

Figure 5:
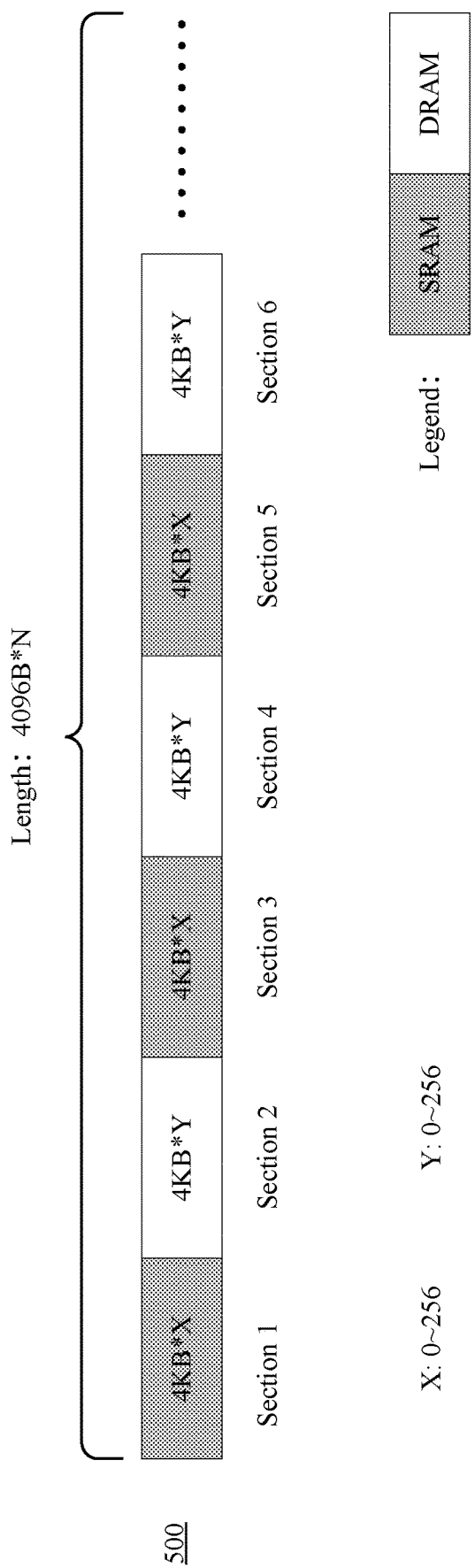
FIG. 5 is a schematic of an example arrangement of storing data in a flash drive memory system with a combination of memories, according to some embodiments of this specification.

FIG. 5 is a schematic of an example arrangement of storing data in a flash drive memory system with a combination of memories, according to some embodiments of this specification. It is appreciated that the arrangement shown in FIG. 5 can be used by flash drive memory system 300 shown in FIG. 3 or workflow shown in FIG. 4. FIG. 5 is for illustrative purposes only, and the arrangement shown in FIG. 5 may have fewer, more, and alternative steps, components and connections depending on the implementation.

As shown in FIG. 5, a data flow 500 can be divided into one or more sectors, with each sector having a same length (e.g., approximately 4 KB). Neighboring (i.e., adjoining, adjacent) sectors of data can be combined together into a section of sectors, and sections adjacent to each other can be assigned to different memory media in an SSD controller (e.g., SSD controller 313 of FIG. 3 or FIG. 4), such as an SRAM (e.g., SRAM 322 of FIG. 3 or FIG. 4) and a DRAM (e.g., DDR 316 of FIG. 3 or FIG. 4). For example, as shown in FIG. 5, each of sections 1, 3, 5, etc. includes X numbers of sectors, which can be assigned to the SRAM. Each of sections 2, 4, 6, etc. includes Y numbers of sectors, which can be assigned to the DRAM. In some embodiments, this assignment can be performed by a data split module (e.g., data split module 320 of FIG. 3), and the assignment can be a part of the data split module's predetermined splitting configuration. In some embodiments, X or Y can be in a range between 0 and 256.

As shown in FIG. 5, the SSD controller can adjust the numbers X and Y for different purposes to maximize the efficiency of the SSD controller. For example, a larger X and a smaller Y allow the SSD controller to store more data in the SRAM, increasing overall writing speed of the SSD controller and reducing SSD controller's energy use. A larger Y and a smaller X allow the SSD controller to buffer a larger amount of data by taking advantage of the DRAM, which can be suitable for applications having a need for frequently writing a large amount of data into the NAND flash. In some embodiments, X can be set to 0, and all incoming data is written into the DRAM. In some embodiments, Y can be set to 0, and all incoming data is written into the SRAM. In some embodiments, When the SRAM runs out of memory space, the remaining incoming data can be written into the DRAM. In some embodiments, the data assignment shown in FIG. 5 (e.g., adjusting X and Y) can be adjusted using software. In some embodiments, the data assignment shown in FIG. 5 (e.g., adjusting X and Y) can be adjusted by an operating system or an application from a host (e.g., host 310 of FIG. 3 or FIG. 4).

The data assignment shown in FIG. 5 provides great flexibility in assigning data to the SRAM and the DRAM, based on specific requirements of applications running on the host or the capacity of the flash drive being managed by the memory controller. Moreover, Splitting the data into alternating sections can also allow for additional parallelism in splitting and combining the data and storing and reading the data in the SRAM and the DRAM, further improving the overall efficiency of executing the writing operation.

Figure 6:
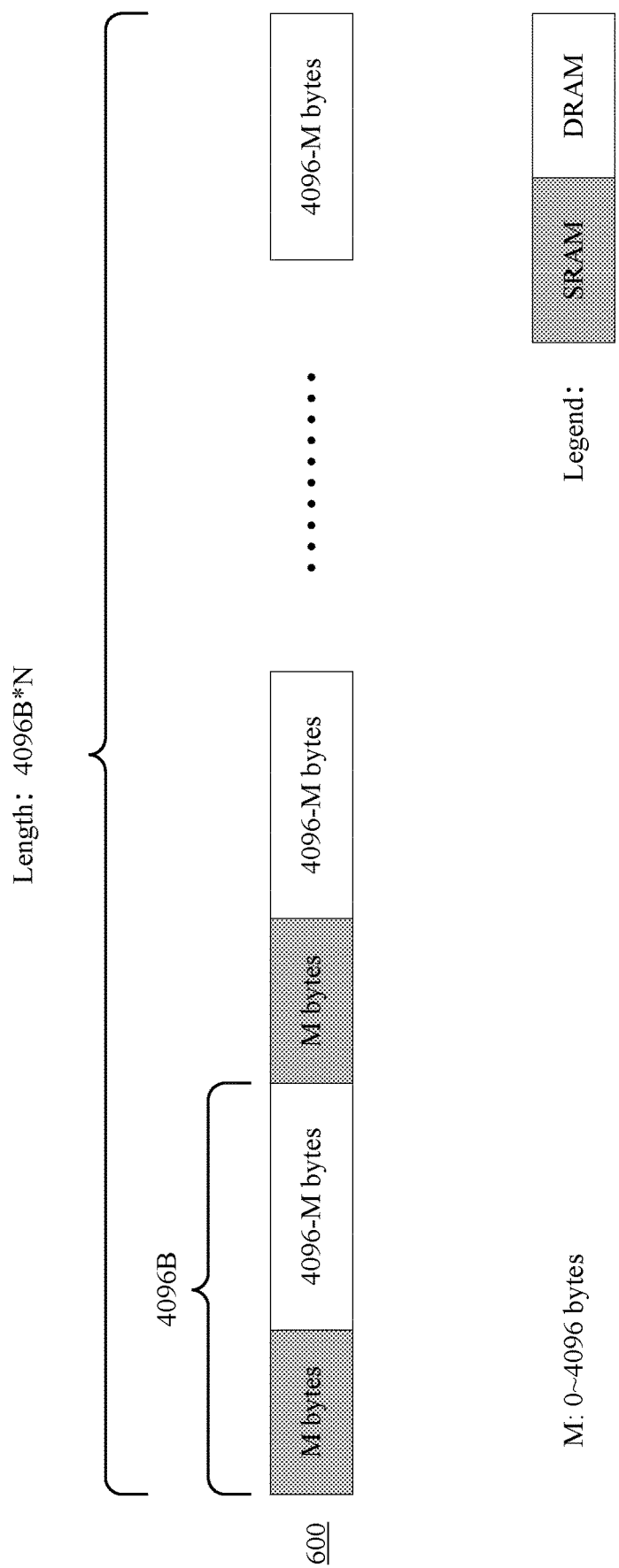
FIG. 6 is a schematic of another example arrangement of storing data in a flash drive memory system with a combination of memories, according to some embodiments of this specification.

FIG. 6 is a schematic of another example arrangement of storing data in a flash drive memory system with a combination of memories, according to some embodiments of this specification. It is appreciated that the arrangement shown in FIG. 6 can be used by flash drive memory system 300 shown in FIG. 3 or workflow shown in FIG. 4. FIG. 6 is for illustrative purposes only, and the arrangement shown in FIG. 6 may have fewer, more, and alternative steps, components and connections depending on the implementation.

As shown in FIG. 6, a data flow 600 can be divided into one or more sectors, with each sector having a same length (e.g., approximately 4 KB). Each sector can be divided into two sections, and sections adjacent to each other can be assigned to different memory media in an SSD controller (e.g., SSD controller 313 of FIG. 3 or FIG. 4), such as an SRAM (e.g., SRAM 322 of FIG. 3 or FIG. 4) and a DRAM (e.g., DDR 316 of FIG. 3 or FIG. 4). For example, as shown in FIG. 6, each of sections 1, 3, etc. includes M bytes, which can be assigned to the SRAM. Each of sections 2, 4, etc. includes 4 KB minus M bytes, which can be assigned to the DRAM. In some embodiments, this assignment can be performed by a data split module (e.g., data split module 320 of FIG. 3), and the assignment can be a part of the data split module's predetermined splitting configuration. In some embodiments, M can be in a range of 0 bytes to 4 KB.

As shown in FIG. 6, the SSD controller can adjust M bytes for different purposes to maximize the efficiency of the SSD controller. For example, a larger M allows the SSD controller to store more data in the SRAM, increasing overall writing speed of the SSD controller and reducing SSD controller's energy use. A smaller M allows the SSD controller to buffer a larger amount of data by taking advantage of the DRAM, which can be suitable for applications having a need for frequently writing a large amount of data into the NAND flash. In some embodiments, M can be set to 0, and all incoming data is written into the DRAM. In some embodiments, M can be set to 4 KB (i.e., maximum storage in a sector), and all incoming data is written into the SRAM. In some embodiments, When the SRAM runs out of memory space, the remaining incoming data can be written into the DRAM. In some embodiments, the data assignment shown in FIG. 5 (e.g., adjusting M) can be adjusted using software. In some embodiments, the data assignment shown in FIG. 5 (e.g., adjusting M) can be adjusted by an operating system or an application from a host (e.g., host 310 of FIG. 3 or FIG. 4).

The data assignment shown in FIG. 6 provides great flexibility in assigning data to the SRAM and the DRAM, based on specific requirements of applications running on the host or the capacity of the flash drive being managed by the memory controller. Moreover, Splitting the data into alternating sections can also allow for additional parallelism in splitting and combining the data and storing and reading the data in the SRAM and the DRAM, further improving the overall efficiency of executing the writing operation.

Figure 7:
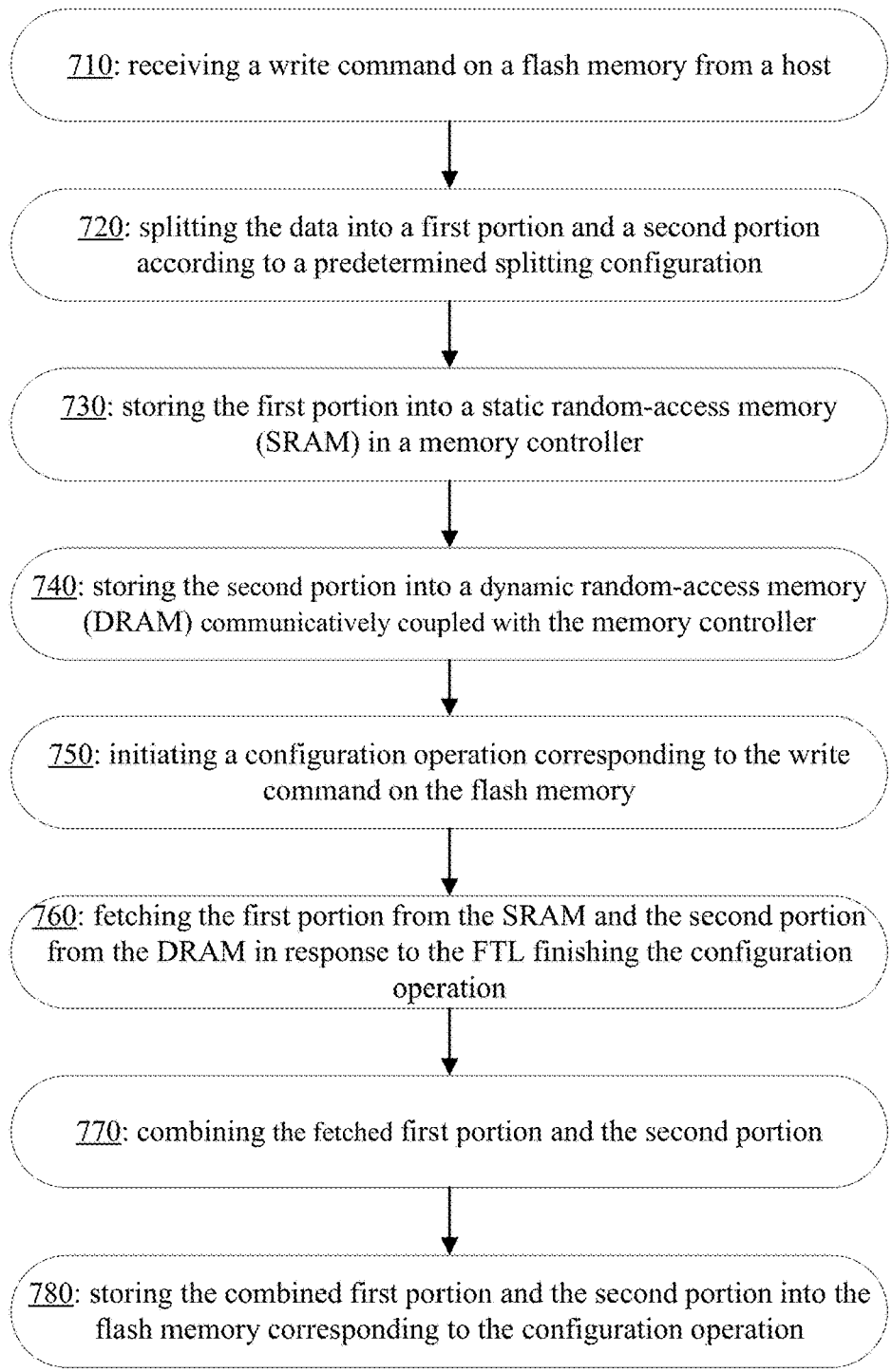
FIG. 7 is a flowchart of an example method of caching data using a combination of memories in a flash drive memory system, according to some embodiments of this specification.

FIG. 7 is a flowchart of an example method of caching data using a combination of memories in a flash drive memory system, according to some embodiments of this specification. It is appreciated that method 700 shown in FIG. 7 can be performed by system 300 shown in FIG. 3 or FIG. 4. FIG. 7 is for illustrative purposes only, and method 700 shown in FIG. 7 may have fewer, more, and alternative steps, components and connections depending on the implementation.

Step 710 includes receiving a write command on a flash memory from a host. In some embodiments, the read command comprises data to be written into the flash memory. The flash memory is similar to NAND flash 315 of FIG. 3. In some embodiments, step 710 can be executed by a memory controller (e.g., SSD controller 313 of FIG. 3) communicatively coupled with the flash memory and configured to manage data read/write operations on the NAND flash. In some embodiments, step 710 can be executed by a communication module (e.g., PCIe DMA 311 of FIG. 3) in charge of managing communications with the host.

Step 720 includes splitting the data into a first portion and a second portion according to a predetermined splitting configuration. In some embodiments, step 720 can be executed by the memory controller, such as a data split module (e.g., data split module 320 of FIG. 3) in the memory controller. In some embodiments, the predetermined splitting configuration can include configurations described in FIG. 3, FIG. 4, FIG. 5, and FIG. 6. For example, as shown in FIG. 5, the predetermined splitting configuration can include dividing the data into a plurality of sections, the plurality of sections include a first type of sections and a second type of sections, each of the first type of sections is of a first length, each of the second type of sections is of a second length, each of the first type of sections adjoins one of the second type of sections in the data, and the first portion comprises the first type of sections and the second portion comprises the second type of sections. As shown in FIG. 6, the predetermined splitting configuration can include dividing the data into a plurality of sections, the plurality of sections include a first type of sections and a second type of sections, each of the first type of sections is of a first length, each of the second type of sections is of a second length, two adjoining sections of the first type and the second type add to a size of a sector in the flash drive, and the first portion comprises the first type of sections and the second portion comprises the second type of sections.

Step 730 includes storing the first portion into a static random-access memory (SRAM) in the memory controller. In some embodiments, step 730 can be executed by the memory controller, such as an SRAM manager (e.g., SRAM manager 321 of FIG. 3) in the memory controller. In some embodiments, the SRAM can be similar to SRAM 322 of FIG. 3. In some embodiments, the first portion is stored into the SRAM when a memory space is allocated in the SRAM. For example, the SRAM manager, having received a notification to store the first portion of the data, can allocate a memory space in the SRAM for storing the first portion. In some embodiments, there may not be any data allocated into the first portion from step 720. In this case, step 730 may be skipped.

Step 740 includes storing the second portion into a dynamic random-access memory (DRAM) communicatively coupled with the memory controller. In some embodiments, step 740 can be executed by the memory controller, such as a DRAM manager (e.g., DRAM manager 312 of FIG. 3) in the memory controller. In some embodiments, the DRAM can be similar to DDR 316 of FIG. 3. In some embodiments, the second portion is stored into the DRAM when a memory space is allocated in the DRAM. For example, the SRAM manager, having received a notification to store the second portion of the data, can allocate a memory space in the DRAM for storing the second portion. In some embodiments, there may not be any data allocated into the second portion from step 720. In this case, step 740 may be skipped.

Step 750 includes initiating a configuration operation corresponding to the write command on the flash memory. In some embodiments, step 750 can be executed by the memory controller, such as an FTL (e.g., FTL 317 of FIG. 3) in the memory controller. In some embodiments, prior to or as a part of executing step 750, the FTL can perform memory management operations (e.g., logical-to-physical addresses translations) associated with the write command.

Step 760 includes fetching the first portion from the SRAM and the second portion from the DRAM in response to the FTL finishing the configuration operation. In some embodiments, finishing the configuration operation refers to a time when the FTL is ready or indicate a ready status to write the data into the flash drive. For example, when the FTL finishes the memory management operations associated with the write command, the FTL can be ready to write into the flash drive. In some embodiments, the FTL may be preoccupied with previous I/O commands. In such cases, the FTL may indicate a ready status after finishing the previous I/O commands. In some embodiments, step 760 can be executed by the memory controller, such as a data combine module (e.g., data combine module 323 of FIG. 3) in the memory controller.

Step 770 includes combining the fetched first portion and the second portion. In some embodiments, step 770 can be executed by the memory controller, such as the data combine module (e.g., data combine module 323 of FIG. 3). In some embodiments, combining the data can be performed according to the predetermined splitting configuration. For example, as shown in FIG. 5, data 500 is split into sections that are alternately stored into the SRAM and the DDR. As a result, when the split sections are combined together, each section is alternately linked in a same order and manner.

Step 780 includes storing the combined first portion and the second portion into the flash memory corresponding to the configuration operation. In some embodiments, step 780 can be performed by the memory controller, such as the FTL in the memory controller. In some embodiments, storing the first and the second portions of data is a part of the configuration operation on the flash drive.

In some embodiments, method 700 further includes freeing the memory spaces allocated to the DRAM and the SRAM in response to storing the combined first portion and the second portion into the flash memory corresponding to the configuration operation. In some embodiments, the freeing of the memory spaces can be executed by the memory controller, and the freed memory spaces can be used for future operations on the flash drive.

Embodiments of this specification provide systems and methods having numerous advantages against existing solutions. Instead of relying on DDRs for caching data prior to writing data into NAND flash memories, SSD controller can utilize SRAMs located on-chip to facilitate in caching the data, and split data for the DDRs and the SRAMs based on specification applications running on the host and capacities of the NAND flash. The use of SRAMs allows the hardware hosting the SSD controller (e.g., a chip, an ASIC, an FPGA, etc.) to have a size and I/O bandwidth that is efficient, and reduces cost and a need for heat dissipation generated by running additional DDRs.

Each process, method, and algorithm described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method, comprising:
receiving, by a memory controller from a host, a write command comprising data to be written into a flash memory;
splitting, by the memory controller, the data into a plurality of alternating first sections and second sections;
storing, by the memory controller, the plurality of first sections as a first portion into a static random-access memory (SRAM) in the memory controller;
storing, by the memory controller, the plurality of second sections as a second portion into a dynamic random-access memory (DRAM) communicatively coupled with the memory controller;
initiating, by a flash translation layer in the memory controller, a configuration operation corresponding to the write command;
fetching, by the memory controller, the first portion from the SRAM and the second portion from the DRAM in response to the flash translation layer indicating a ready status to store the data into the flash memory;
combining, by the memory controller, the fetched first portion and the fetched second portion; and
storing, by the flash translation layer, the combined first portion and the second portion into the flash memory.

2. The method of claim 1, wherein the memory controller is implemented on an application-specific integrated circuit (ASIC).

3. The method of claim 1, wherein the flash memory includes solid state drives (SSDs).

4. The method of claim 1, wherein the DRAM is one or more double data rate (DDR) synchronous dynamic random access memory (SDRAM).

5. The method of claim 1, further comprising:
allocating, by an SRAM controller in the memory controller, a first memory space in the SRAM to store the first portion;
allocating, by a DRAM controller in the memory controller, a second memory space in the DRAM to store the second portion; and
freeing, by the memory controller, the first memory space and the second memory space in response to storing the combined first portion and the second portion into the flash memory.

6. The method of claim 1, wherein the splitting the data into the plurality of alternating first sections and second sections comprises:
assigning odd-numbered sections as the first sections for storing in the SRAM, and assigning even-numbered sections as the second sections for storing in the DRAM, or
assigning the odd-numbered sections as the second sections for storing in the DRAM, and assigning the even-numbered sections as the first sections for storing in the SRAM.

7. The method of claim 1, wherein the splitting the data into the plurality of alternating first sections and second sections comprises:
segmenting the data into a plurality of sectors; and
for each of the plurality of sectors, assigning first bytes of the sector as the first sections for storing in the SRAM, and assigning remaining bytes of the sector as the second sections for storing in the DRAM.

8. Non-transitory computer-readable storage media storing instructions that, when executed by one or more processors, cause the one or more processors to perform operations comprising:
receiving, by a memory controller from a host, a write command comprising data to be written into a flash memory;
splitting, by the memory controller, the data into a plurality of alternating first sections and second sections;
storing, by the memory controller, the plurality of first sections as a first portion into a static random-access memory (SRAM) in the memory controller;
storing, by the memory controller, the plurality of second sections as a second portion into a dynamic random-access memory (DRAM) communicatively coupled with the memory controller;
initiating, by a flash translation layer in the memory controller, a configuration operation corresponding to the write command;
fetching, by the memory controller, the first portion from the SRAM and the second portion from the DRAM in response to the flash translation layer indicating a ready status to store the data into the flash memory;
combining, by the memory controller, the fetched first portion and the fetched second portion; and
storing, by the flash translation layer, the combined first portion and the second portion into the flash memory.

9. The non-transitory computer-readable storage media of claim 8, wherein the splitting the data into the plurality of alternating first sections and second sections comprises:
assigning odd-numbered sections as the first sections for storing in the SRAM, and assigning even-numbered sections as the second sections for storing in the DRAM, or
assigning the odd-numbered sections as the second sections for storing in the DRAM, and assigning the even-numbered sections as the first sections for storing in the SRAM.

10. The non-transitory computer-readable storage media of claim 8, wherein the splitting the data into the plurality of alternating first sections and second sections comprises:
segmenting the data into a plurality of sectors; and
for each of the plurality of sectors, assigning first bytes of the sector as the first sections for storing in the SRAM, and assigning remaining bytes of the sector as the second sections for storing in the DRAM.

11. A system, comprising:
a host;
a memory controller communicatively coupled with the host;
a dynamic random-access memory (DRAM) communicatively coupled with the memory controller; and
a flash memory communicatively coupled to the memory controller,
wherein the memory controller comprises a static random-access memory (SRAM) and is configured to:
receive, from the host, a write command comprising data to be written to the flash memory,
split the data into a plurality of alternating first sections and second sections;
store the plurality of first sections as a first portion into the SRAM, store the plurality of second sections as a second portion into the DRAM, initiate a configuration operation corresponding to the write command using a flash translation layer in the memory controller, fetch the first portion from the SRAM and the second portion from the DRAM in response to the flash translation layer indicating a ready status to store the data into the flash memory, combine the fetched first portion and the fetched second portion, and store the combined first portion and the second portion into the flash memory.

12. The system of claim 11, wherein the memory controller is implemented on an application-specific integrated circuit (ASIC).

13. The system of claim 11, wherein the flash memory includes solid state drives (SSDs).

14. The system of claim 11, wherein the DRAM is one or more double data rate (DDR) synchronous dynamic random access memory (SDRAM).

15. The system of claim 11, wherein the memory controller is further configured to:

allocate, by an SRAM controller in the memory controller, a first memory space in the SRAM to store the first portion;

allocate, by a DRAM controller in the memory controller, a second memory space in the DRAM to store the second portion; and freeing, by the memory controller, the first memory space and the second memory space in response to storing the combined first portion and the second portion into the flash memory.

16. The system of claim 11, wherein the memory controller is an open-channel controller for the flash memory.

17. The system of claim 11, wherein to split the data into the plurality of alternating first sections and second sections, the memory controller is further configured to:

assign odd-numbered sections as the first sections for storing in the SRAM, and assign even-numbered sections as the second sections for storing in the DRAM, or assign the odd-numbered sections as the second sections for storing in the DRAM, and assign the even-numbered sections as the first sections for storing in the SRAM.

18. The system of claim 11, wherein to split the data into the plurality of alternating first sections and second sections, the memory controller is further configured to:

segment the data into a plurality of sectors; and for each of the plurality of sectors, assign first bytes of the sector as the first sections for storing in the SRAM, and assign remaining bytes of the sector as the second sections for storing in the DRAM.

* * * * *